United States Patent [19]
Chu et al.

[11] Patent Number: 5,574,586
[45] Date of Patent: Nov. 12, 1996

[54] SIMULTANEOUS OPTICAL COMPRESSION AND DECOMPRESSION APPARATUS

[75] Inventors: Kwang Uk Chu; Byeong H. Kim; Seo Y. Shin; Ki H. Kim; Yong h. Won, all of Daejeon, Rep. of Korea

[73] Assignees: Electronics and Telecommunications Research Institute, Daejeon; Korea Telecommunication Authority, Seoul, both of Rep. of Korea

[21] Appl. No.: 346,919

[22] Filed: Nov. 23, 1994

[30] Foreign Application Priority Data

Dec. 3, 1993 [KR] Rep. of Korea .................. 1993-26431

[51] Int. Cl.⁶ ........................... H04J 14/08; H04B 10/00
[52] U.S. Cl. ........................ 359/140; 359/139; 359/158
[58] Field of Search ........................... 359/114, 117, 359/128, 138–139, 140, 158; 370/7

[56] References Cited

U.S. PATENT DOCUMENTS

| | | | |
|---|---|---|---|
| 5,121,240 | 6/1992 | Acampora | 359/138 |
| 5,410,671 | 4/1995 | Elgamal et al. | 395/425 |

Primary Examiner—Leo Boudreau
Assistant Examiner—Kinfe-Michael Negash
Attorney, Agent, or Firm—Spencer & Frank

[57] ABSTRACT

A simultaneous optical compression and decompression apparatus having a simple symmetrical arrangement including a plurality of optical splitting/combining units capable of achieving simultaneous splitting and combining of optical signals in opposite directions, a plurality of optical delay units each arranged between adjacent ones of the optical splitting/combining units and adapted to delay the time taken for an optical signal to pass therethrough in each of opposite directions by a predetermined time, so as to reproduce the optical signal in accordance with a predetermined rule. The apparatus also includes a pair of optical isolation units respectively connected to opposite end-side ones of the optical splitting/combining units, each of the optical isolation units being adapted to allow an optical signal to pass therethrough in one direction; a pair of optical switching units respectively connected to opposite end-side ones of the optical splitting/combining units and adapted to switch optical signals output from the optical splitting/combining units in response to control signals, so as to allow predetermined optical signals to pass therethrough; and a pair of control units respectively connected to the optical switching units and adapted to apply the control signals to the optical switching units.

2 Claims, 8 Drawing Sheets

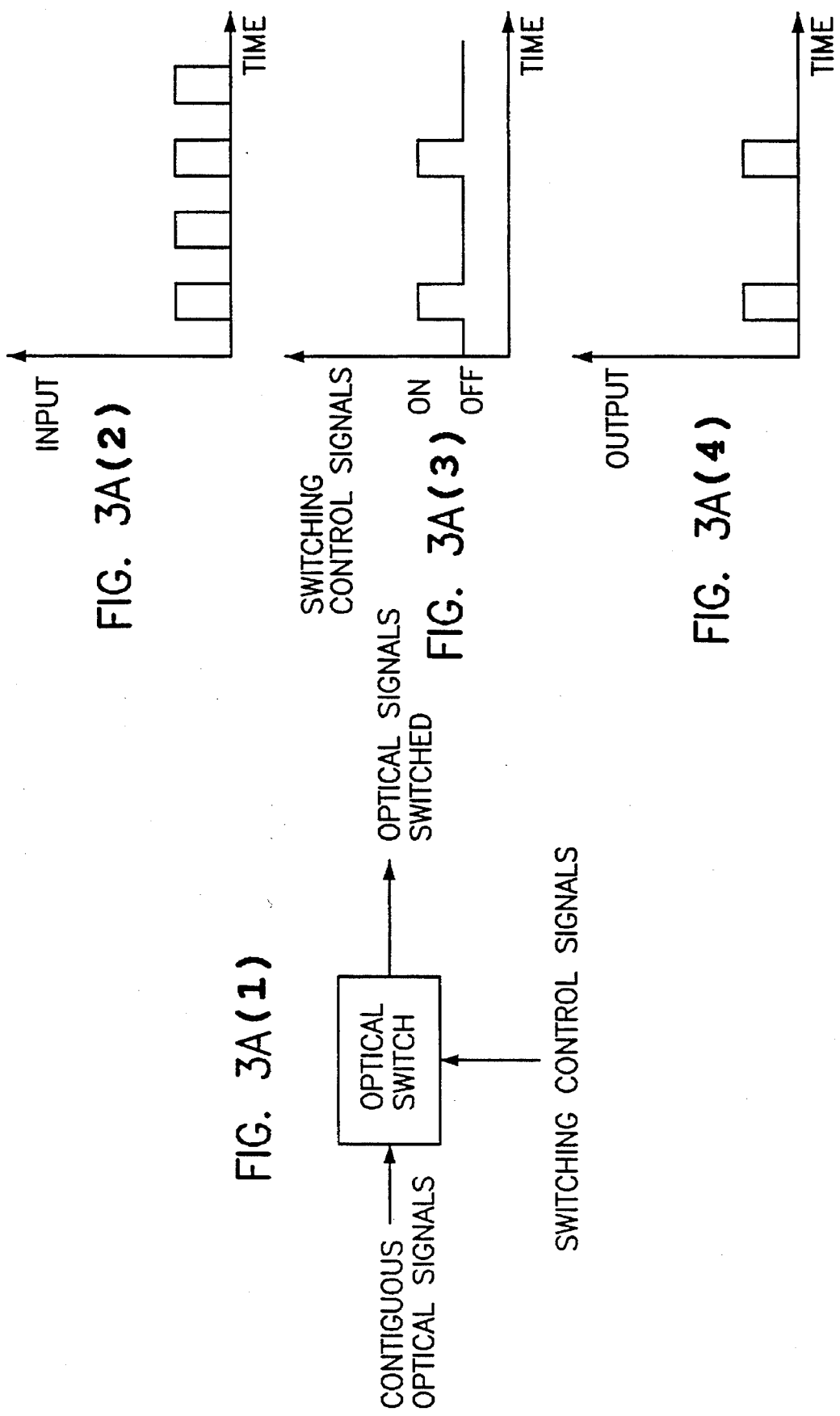

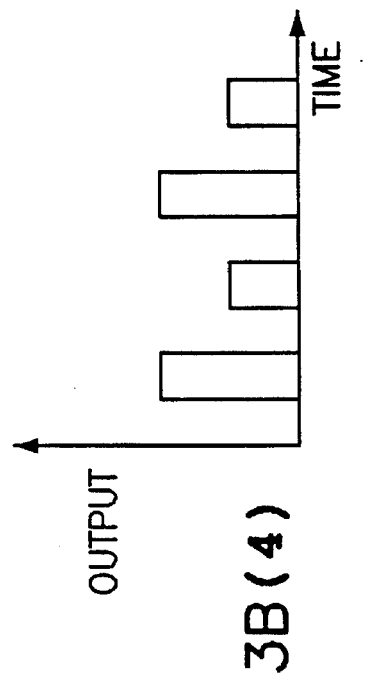
FIG. 3B(2) INPUT
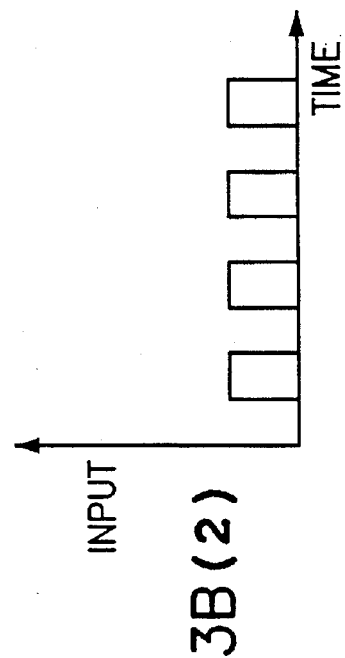
FIG. 3B(3) ADDITION SIGNALS ON/OFF
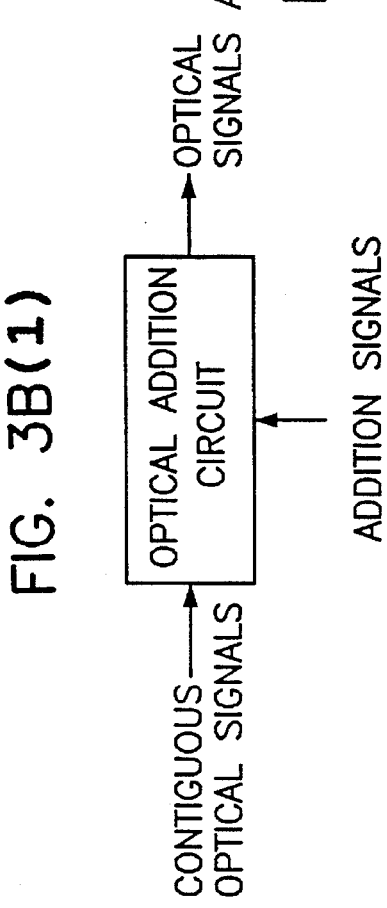
FIG. 3B(4) OUTPUT
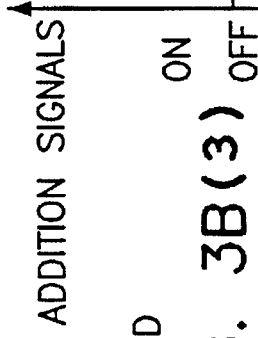
FIG. 3B(1)
CONTIGUOUS OPTICAL SIGNALS → OPTICAL ADDITION CIRCUIT → OPTICAL SIGNALS ADDED
ADDITION SIGNALS

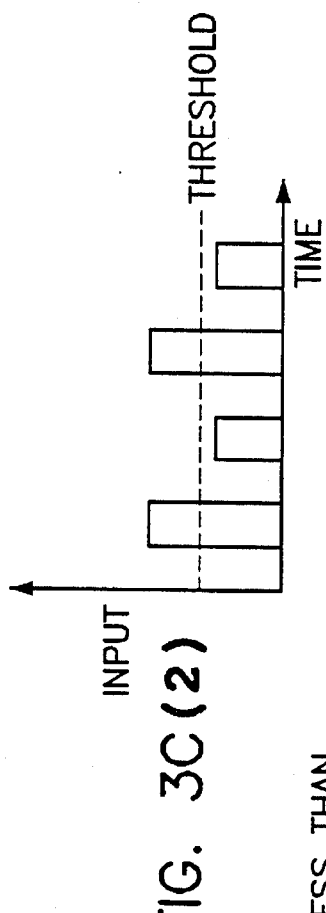
FIG. 3C(2)
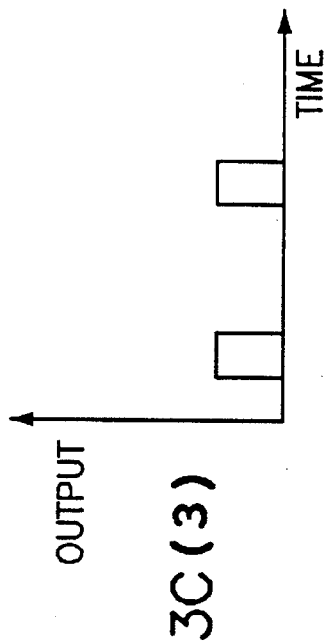
FIG. 3C(3)
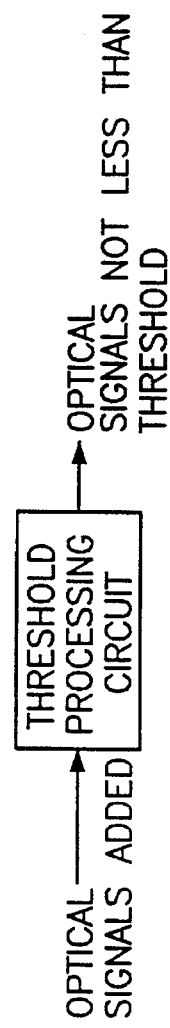
FIG. 3C(1)

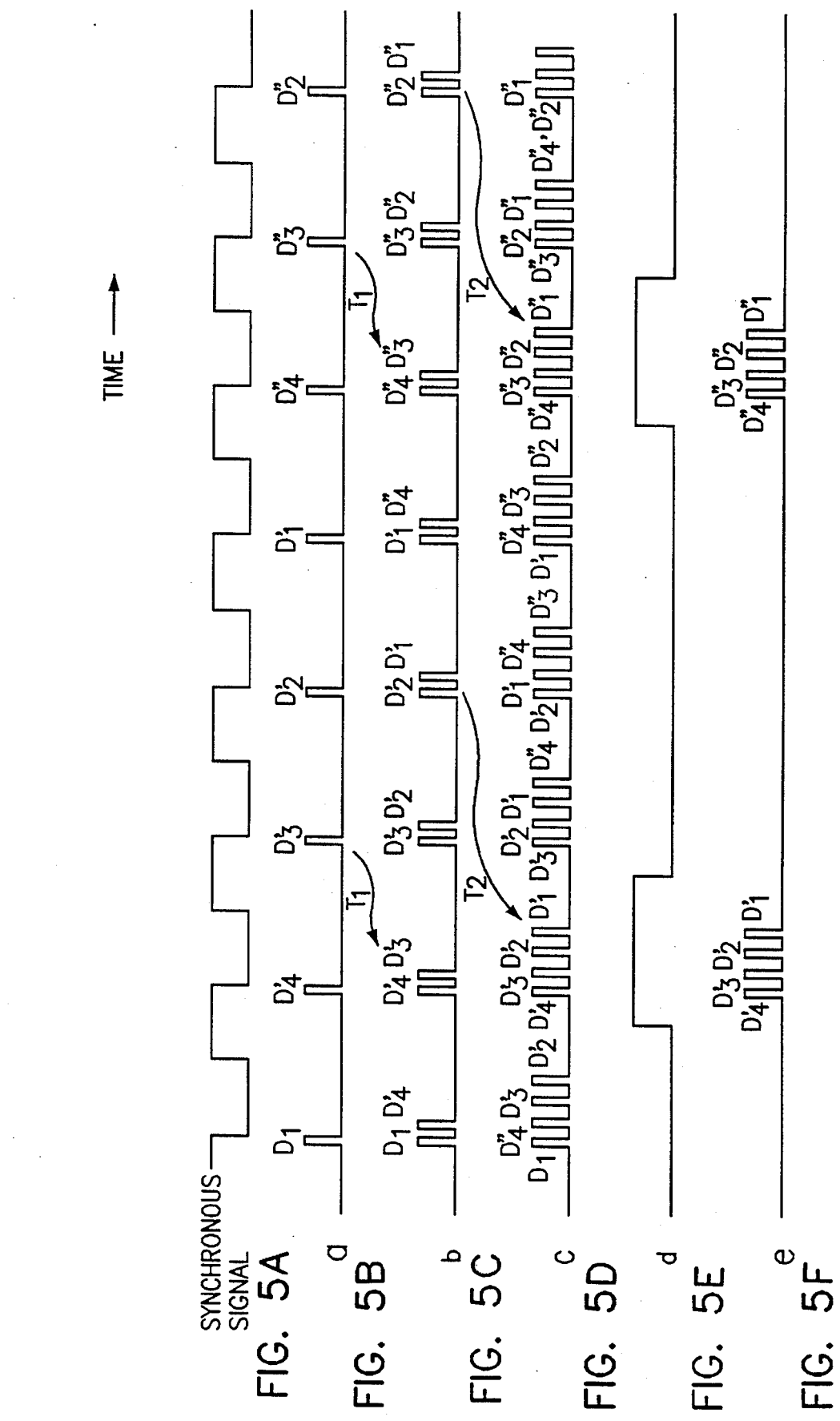

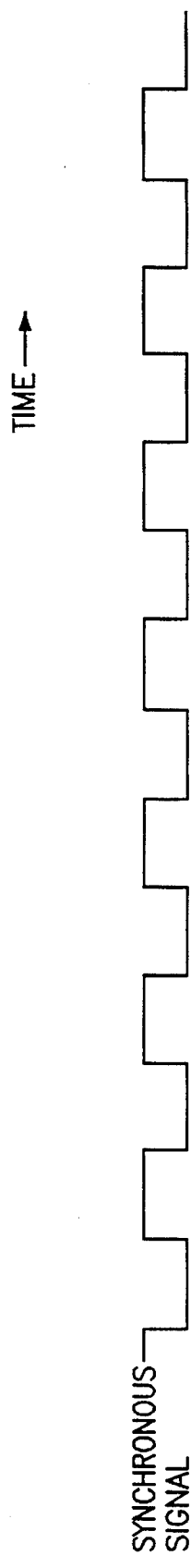
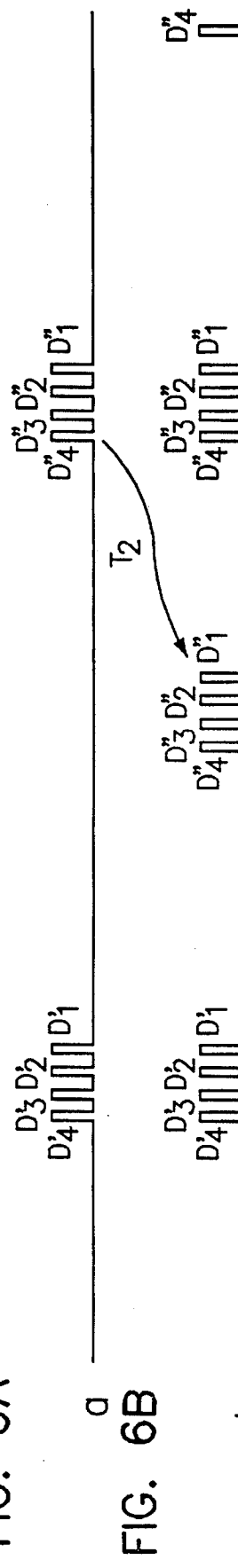
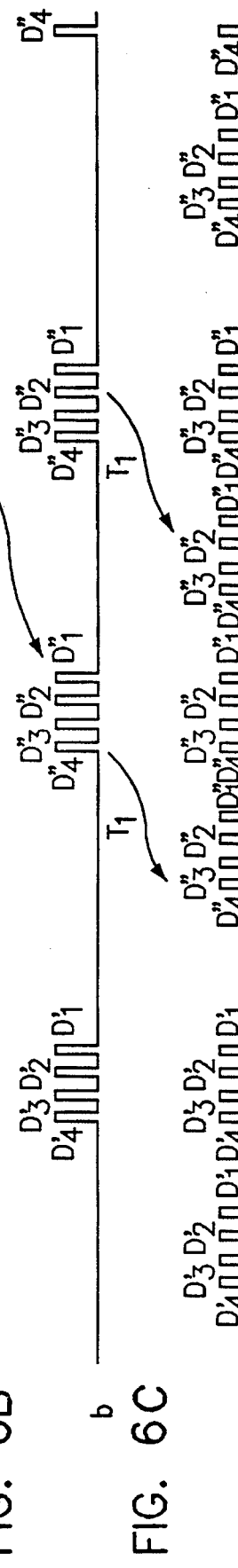
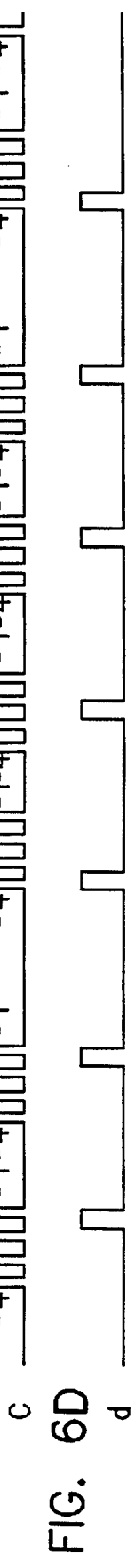

SIMULTANEOUS OPTICAL COMPRESSION AND DECOMPRESSION APPARATUS

BACKGROUND OF THE INVENTION

1. Field of the Invention

The present invention relates to a simultaneous optical compression and decompression apparatus for multiplexing and demultiplexing optical signals in an optical manner other than an electrical manner in an optical communication and switching system.

2. Description of the Prior Art

Generally, optical communication and switching systems are inevitably equipped with an optical compression unit and an optical decompression unit in order to multiplex and demultiplex optical signals in an optical manner other than an electrical manner. However, conventional optical compression and decompression units have different arrangements with respect to each other. For this reason, they are difficult to manufacture because they should be made separately from each other. Furthermore, a number of control units are required for the conventional optical compression and decompression units. This causes manufacturing difficulty of the overall system and an instability of the system.

SUMMARY OF THE INVENTION

Therefore, an object of the invention is to solve the above-mentioned problems encountered in the prior art and, thus, to provide a simultaneous optical compression and decompression apparatus having a simple symmetrical arrangement.

In accordance with the present invention, this object can be accomplished by providing a simultaneous optical compression and decompression apparatus comprising: M+1 2×2 optical splitting/combining means enabling simultaneous splitting and combining of optical signals in opposite directions, the M+1 2×2 optical splitting/combining means having input and output terminals and being multi-stage connected to each other at the input and output terminals thereof in a cascade manner; M delay means each disposed on one of the lines respectively connecting the input and output terminals of adjacent ones of the M+1 2×2 optical splitting/combining means and adapted to delay a signal on the connecting line; first optical isolation means adapted to input contiguous optical signals of N ($N=2^M$) bits at one of the terminals of a first one of the M+1 2×2 optical splitting/combining means in one direction; first optical switching means adapted to switch contiguous optical signals reversely compressed and output from the first 2×2 optical splitting/combining means in response to a first control signal applied thereto; first control means adapted to receive a synchronous signal from an external source and apply the first control signal to the first optical switching means in response to the synchronous signal; second optical isolation means adapted to input compressed contiguous optical signals of N bits at one of terminals of an M+1-th one of the M+1 2×2 optical splitting/combining means in one direction; second optical switching means adapted to switch compressed contiguous optical signals of N bits output from the M+1-th 2×2 optical splitting/combining means in response to a second control signal applied thereto; and second control means adapted to receive a synchronous signal from an external source and apply the second control signal to the second optical switching means in response to the synchronous signal.

BRIEF DESCRIPTION OF THE DRAWINGS

Other objects and aspects of the invention will become apparent from the following description of embodiments with reference to the accompanying drawings in which:

FIGS. 3A(1) to 3C(3) illustrate various examples of each of the optical switching units and waveforms of various signals associated therewith;

FIGS. 5A to 5F are timing diagrams illustrating a procedure of compressing contiguous signals by the unit of 4 bits in the simultaneous optical compression and decompression apparatus shown in FIG. 4; and FIGS. 6A to 6F are timing diagrams illustrating a procedure of decompressing compressed optical signals in the form of contiguous optical signals in the simultaneous optical compression and decompression apparatus shown in FIG. 4.

DETAILED DESCRIPTION OF THE PREFERRED EMBODIMENTS

Figure 1:
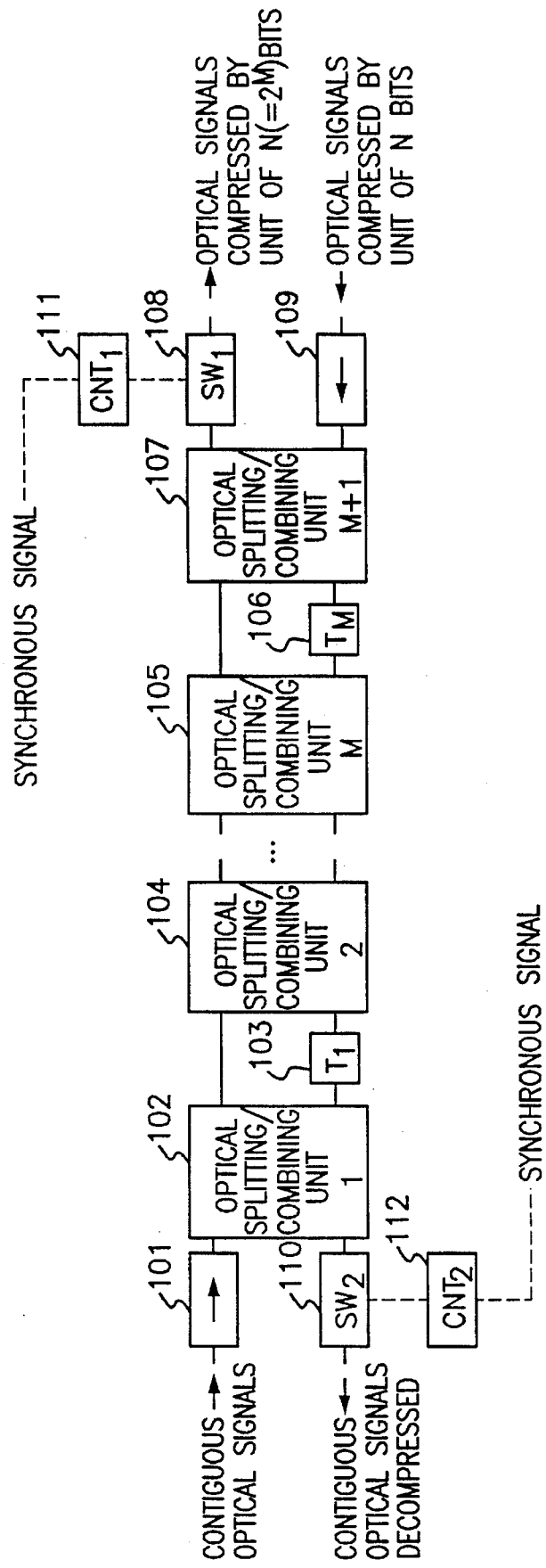
FIG. 1 is a block diagram illustrating an optical compression and decompression apparatus capable of compressing contiguous optical signals by the unit of N ($N=2^M$) bits and simultaneously decompressing compressed optical signals of N bits in the form of contiguous optical signals.

FIG. 1 is a block diagram illustrating an optical compression and decompression apparatus in accordance with the present invention.

The optical compression and decompression apparatus is adapted to compress contiguous optical signals by the unit of N bits ($N=2^M$) and simultaneously decompress the compressed optical signals in the form of contiguous optical signals with original intervals. As shown in FIG. 1, the optical compression and decompression apparatus includes a pair of optical isolation units 101 and 109, a pair of optical switching units 108 and 110, a pair of control units 111 and 112, M+1 2×2 optical splitting/combining units (only four units 102, 104, 105 and 107 respectively corresponding to the first one, the second one, the M-th one and the last, M+1-th one are shown in FIG. 1), and M optical delay units (only two units 103 and 106 respectively corresponding to the first one and the last, M-th one are shown in FIG. 1). In the optical compression and decompression apparatus, the compression interval of contiguous optical signals can be controlled depending on delay times respectively obtained by the optical delay units 103 and 106. The delay time obtained by each of the optical delay units 103 and 106 satisfies the following equation:

$$T_{i+1} = 2T_i$$

where, i is a natural number.

Now, a compression procedure carried out by the optical compression and decompression apparatus having the above-mentioned arrangement in accordance with the present invention will be described.

First, contiguous optical signals passing through the optical isolation unit 101 without being subjected to any processing pass the first 2×2 optical splitting/combining unit 102, the first optical delay unit 103 having a delay time $T_1$ and the second 2×2 optical splitting/combining unit 104 sequentially. As a result, the second 2×2 optical splitting/combining unit 104 outputs at its output terminals (right terminals in FIG. 1) contiguous optical signals by the unit of 2 bits corresponding to the delay time $T_1$. The contiguous optical signals from the second 2×2 optical splitting/combining unit 104 then pass through the next, third 2×2 optical splitting/combining unit, the second delay unit having a delay time $T_2$ ($T_2=2T_1$) and the third 2×2 optical splitting/combining unit sequentially. As a result, the third 2×2 optical splitting/combining unit outputs at its right terminals contiguous optical signals by the unit of 4 bits corresponding to the delay time $T_2$. In such a manner, the number of bits of contiguous signals increases twice every time when the contiguous signals pass through each of the 2×2 optical splitting/combining units and each corresponding one of delay units. Consequently, the last, M+1-th 2×2 optical splitting/combining unit 107 outputs at its right terminals contiguous optical signals by the unit of $2^M$ bits corresponding to the delay time $T_M$ of the last, M-th delay unit 106. To upper and lower right terminals of the M+1-th 2×2 optical splitting/combining unit 107, the optical switching unit 108 ($SW_1$) and the optical isolation unit 109 are coupled, respectively. Since the optical signals emerging from the lower right terminal of the M+1-th 2×2 optical splitting/combining unit 107 have the travel direction opposite to the signal processing direction of the optical isolation unit 109, they can not pass through the optical isolation unit 109. On the other hand, the control unit ($CNT_1$) 111 applies a control signal to the optical switching unit 108 upon receiving a synchronous signal so that only a compressed optical signal of $2^M$ bits constituted by optical signals of frames of the same time point among the contiguous signals emerging from the lower right terminal of the M+1-th 2×2 optical splitting/combining unit 107 is allowed to pass through the optical switching unit 108. Thus, contiguous optical signals received in the optical isolation unit 101 of the first stage are compressed by the unit of $2^M$ bits.

A decompression procedure carried out by the optical compression and decompression apparatus in accordance with the present invention will now be described.

As optical signals compressed by the unit of $2^M$ bits are received in the optical isolation unit 109 connected to the lower right terminal of the M+1-th 2×2 optical splitting/combining unit 107, they pass through the optical isolation unit 109 without being subjected to any processing. The optical signals emerging from the optical isolation unit 109 pass through the M+1-th 2×2 optical splitting/combining unit 107, the M-th optical delay unit 106 having the delay time $T_M$ and the M-th 2×2 optical splitting/combining unit 105 sequentially. As a result, the M-th 2×2 optical splitting/combining unit 105 outputs at its output terminals (left terminals in FIG. 1) compressed optical signals including input signals received therein and signals reproduced from the input signals, but shifted from the input signals by the delay time $T_M$. The optical signals emerging from the M-th 2×2 optical splitting/combining unit 105 then pass through the M-1-th optical delay unit and the M-1-th 2×2 optical splitting/combining unit. As a result, the M-1-th 2×2 optical splitting/combining unit outputs at its left terminals compressed optical signals including input signals received therein and signals reproduced from the input signals, but shifted from the input signals by the delay time $T_{M-1}$.

In such a manner, the compressed $2^M$-bit signals are reproduced twice every time when the signals pass through each of 2×2 optical splitting/combining units and each corresponding one of delay units. Consequently, the number of reproduced $2^M$-bit signals emerging from the left terminals of the first 2×2 optical splitting/combining unit 102 is $2^M$.

The upper and lower right terminals of the first 2×2 optical splitting/combining unit 102, the optical switching unit 110 ($SW_2$) and the optical isolation unit 101 are coupled, respectively.

Since the optical signals emerging from the upper left terminal of the first 2×2 optical splitting/combining unit 102 have the travel direction opposite to the signal processing direction of the optical isolation unit 101, they can not pass through the optical isolation unit 101. On the other hand, the control unit ($CNT_2$) 112 applies a control signal to the optical switching unit 110 upon receiving a synchronous signal so that only optical signals of one bit, having the same interval and the same order as the original input signals, among $2^M$ $2^M$-bit optical signals emerging from the lower left terminal of the first 2×2 optical splitting/combining unit 102 are allowed to pass through the optical switching unit 110. Thus, compressed optical signals received in the optical isolation unit 109 of the first stage are decompressed with the original interval.

Consequently, where contiguous optical signals are received in the first optical isolation unit 101 while compressed $2^M$-bit optical signals are received in the last optical isolation unit 109, the optical switching unit 108 ($SW_1$) of the last stage outputs compressed $2^M$-bit optical signals while the optical switching unit 110 ($SW_2$) of the first stage outputs decompressed optical signals.

The optical isolation units 101 and 109 have the function of allowing an optical signal advancing in the same direction as the signal processing direction thereof indicated by the arrow shown in FIG. 1 to pass therethrough and, of preventing an optical signal of the opposite direction from passing therethrough. Generally, such optical isolation units comprise optical isolators.

FIGS. 2A to 2G are block diagrams respectively illustrating various input-output relationships of each of the 2×2 optical splitting/combining units. In FIGS. 2A to 2G, the symbol "−" represents an optical signal input at each terminal of each 2×2 optical splitting/combining unit whereas the symbol "+" represents an optical signal output from each terminal of each 2×2 optical splitting/combining unit. The reference characters a, b, c and d denote signals, respectively.

Now, a detailed operation of each optical splitting/combining unit will be described in conjunction with FIGS. 2A to 2G.

Where the optical splitting/combining unit receives an optical signal at one of four terminals thereof, as in each case of FIGS. 2A to 2D, it outputs optical signals reduced in intensity by half at two terminals opposite to the input terminal, respectively.

Figure 2A:
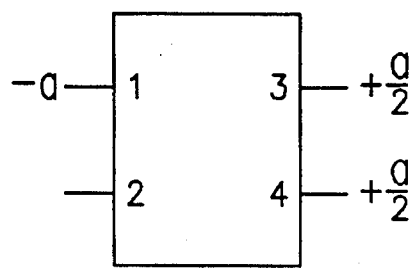
FIGS. 2A to 2G are block diagrams respectively illustrating various input-output relationships of each of 2×2 optical splitting/combining units constituting a part of the optical compression and decompression apparatus shown in FIG. 1.
Figure 2B:
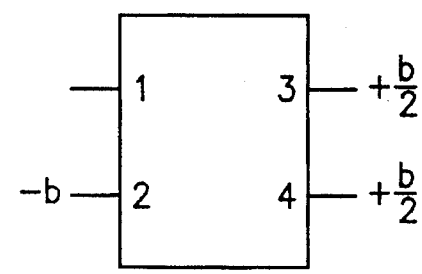
Figure 2C:
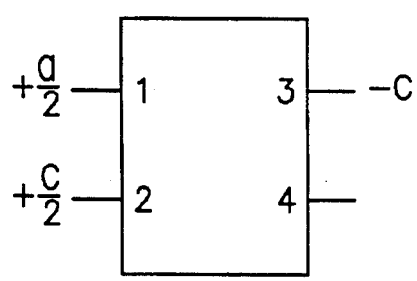
Figure 2D:
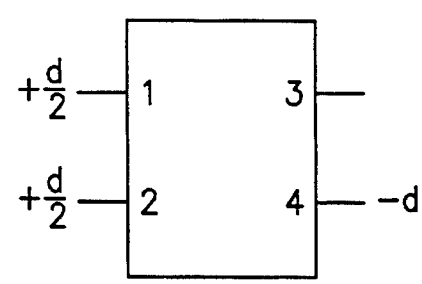
Figure 2E:
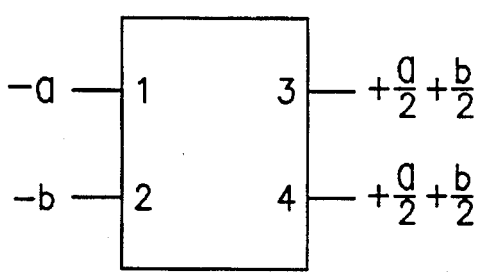
Figure 2F:
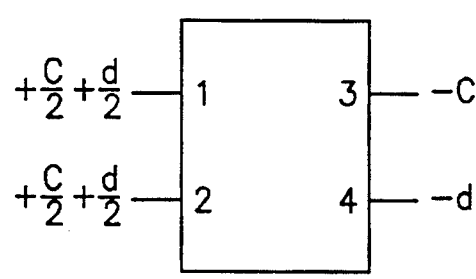
Figure 2G:
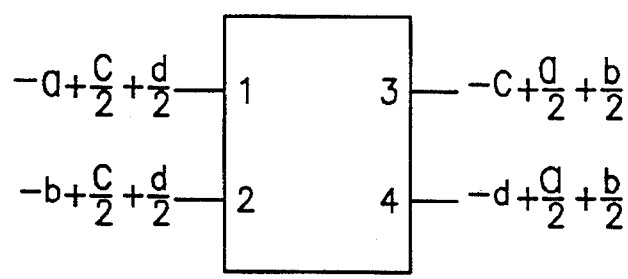

FIGS. 2E to 2G show that even when the optical splitting/combining unit receives optical signals at at least two terminals thereof, it carries out operations for the input signals in the same manner as in FIGS. 2A to 2D without generating any relationship among the operations. Accordingly, the 2×2 optical splitting/combining unit has a function capable of splitting and combining optical signals in opposite directions. Such an optical splitting/combining unit is well-known and commercially available. The representative splitting/combining unit may be "SC-5050-0202-1300-S-L" available from E-TEK Dynamics, Inc., U.S.A..

Each of the optical delay units performs a function of delaying the time taken for an optical signal to pass therethrough in each of opposite directions. The optical delay unit comprises an optical fiber having a spiral structure. Since such an optical delay unit is well-known by a skilled person in the technical field, its detailed description will be omitted.

FIGS. 3A(1) to 3C(3) illustrate various examples of each of the optical switching units 108 and 110 and waveforms of various signals associated therewith.

In the case of FIG. 3A(1), each of the optical switching units 108 and 110 comprises an optical switch. Alternatively, each of the optical switching units 108 and 110 may comprise an optical addition circuit or a threshold processing circuit, as shown in FIG. 3B(1) or FIG. 3C(1).

Where the optical switching unit comprises the optical switch, as shown in FIG. 3A(1), it receives a switching control signal from an external source. By the switching control signal, a determination is made about whether contiguous optical input signals are allowed to pass through the optical switch. In other words, when contiguous optical signals are received in the optical switch at a predetermined interval, only those respectively corresponding to control switching signals of an ON state are allowed to pass through the optical switch, as shown in the timing diagrams of FIGS. 3A(2) to 3A(4). The optical switch may comprise a well-known modulator. The representative modulator may be "MEOM-1310-MZ-05" commercially available from E-TEK Dynamics, Inc., U.S.A..

Where the optical switching unit comprises the optical addition circuit, as shown in FIG. 3B(1), it receives an addition signal as a control signal from an external source. By the addition signal, a determination is made about an addition of light. In other words, when contiguous optical signals are received in the optical addition circuit at a predetermined interval, a predetermined amount of light is added for each optical input signal only at at ON state of the addition signal, as shown in the timing diagrams of FIG. 3B(2) to FIG. 3B(4).

On the other hand, the optical switching unit may comprise the threshold processing circuit which serves to allow only signals having a voltage level not less than a predetermined threshold voltage to pass therethrough. When input signals are applied to the threshold processing circuit, only those having the voltage level not less than the predetermined threshold voltage are allowed to pass through the threshold processing circuit, as shown in the timing diagrams of FIGS. 3C(2) and 3C(3). As a result, output signals identical to those shown in FIG. 3A(4) are obtained. The output signals generated from the threshold processing circuit may be electrical signals instead of optical signals. In this case, use of photodiodes for converting the optical signals having the voltage level not less than the threshold voltage into electrical signals may be reduced.

Figure 4:
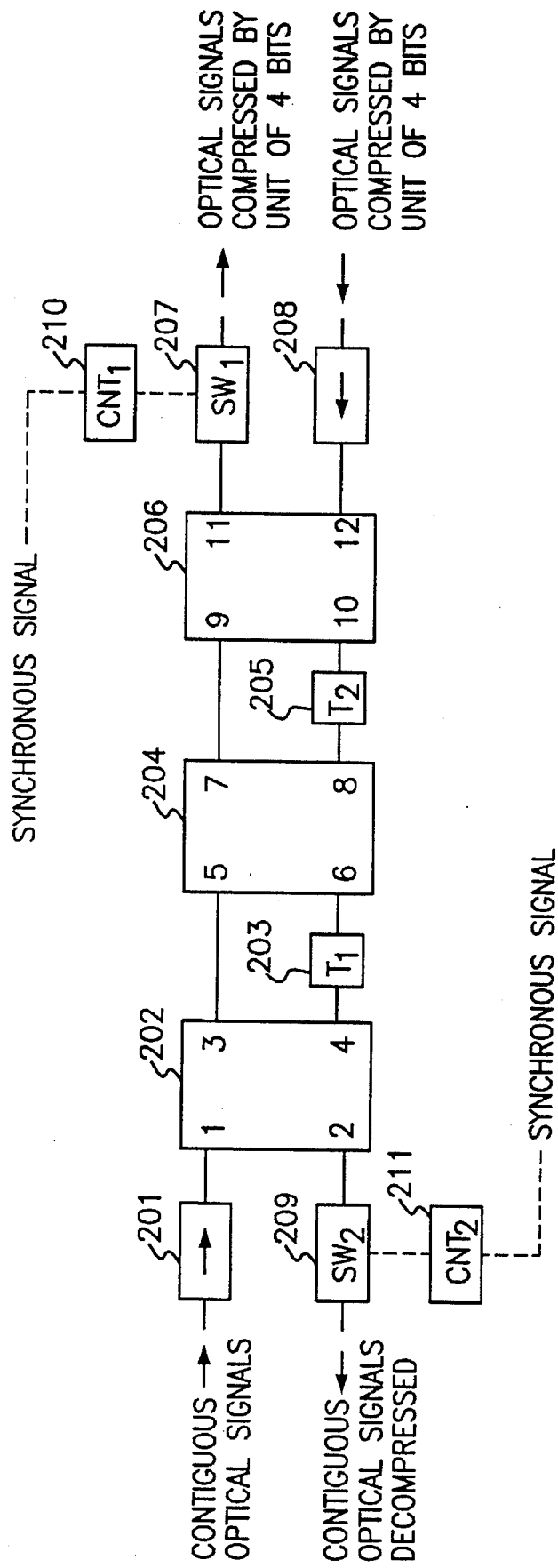
FIG. 4 is a block diagram illustrating a simultaneous optical compression and decompression apparatus in accordance with the present invention capable of compressing contiguous optical signals by the unit of 4 bits and simultaneously decompressing compressed optical signals of 4 bits in the form of contiguous optical signals.

FIG. 4 is a block diagram illustrating a simultaneous optical compression and decompression apparatus in accordance with the present invention capable of compressing contiguous optical signals by the unit of 4 bits and simultaneously decompressing compressed optical signals of 4 bits in the form of contiguous optical signals. FIGS. 5A to 5F are timing diagrams illustrating a procedure of compressing contiguous signals by the unit of 4 bits at intervals corresponding to ⅛ of the interval of a synchronous signal. FIGS. 6A to 6F are timing diagrams illustrating a procedure of decompressing the compressed optical signals in the form of contiguous optical signals with original intervals.

As shown in FIG. 4, the optical compression and decompression apparatus has the same arrangement as that of FIG. 1 except that N is 4, that is, M is 2. In other words, the optical compression and decompression apparatus of FIG. 4 includes three (namely, M+1=3) 2×2 optical splitting/combining units 202, 204 and 206 and two (M=2) optical delay units 203 and 205 respectively having delay times $T_1$ and $T_2$. Other arrangements of the optical compression and decompression apparatus including a pair of optical isolation units 201 and 208, a pair of optical switching units 207 and 209 and a pair of control units 210 and 211 are the same as those of FIG. 1.

Now, timing relationships of signals generated from various parts of the optical compression and decompression apparatus will be described in conjunction with FIGS. 5A to 5F and FIGS. 6A to 6F.

First, contiguous optical signals Dn, Dn' and Dn" (4-bit optical signals in frames of the same time point) shown by a waveform "a" in FIG. 5B enter the optical isolation unit 201. Since the optical signals received in the optical isolation unit 201 have the travel direction identical to the signal processing direction of the optical isolation unit 201, they are allowed to pass through the optical isolation unit 201 and then enter a first terminal of the first 2×2 optical splitting/combining unit 202. This case corresponds to the case shown in FIG. 2A. As a result, the first 2×2 optical splitting/combining unit 202 outputs at its third and fourth terminals contiguous optical signals reduced in intensity by half. The optical signals emerging from the third terminal of the first 2×2 optical splitting/combining unit 202 are directly applied to a fifth terminal of the second 2×2 optical splitting/combining unit 204, while the optical signals emerging from the third terminal of the first 2×2 optical splitting/combining unit 202 are applied to a sixth terminal of the second 2×2 optical splitting/combining unit 204 via the optical delay unit 203 having the delay time $T_1$ corresponding to ⅞ of the interval of synchronous signals. This case corresponds to the case of FIG. 2E. As a result, the second 2×2 optical splitting/combining unit 204 outputs at its seventh and eighth terminals contiguous optical signals compressed by the unit of 2 bits at an interval corresponding to ⅛ of the interval of synchronous signals. The optical signals emerging from the seventh terminal of the second 2×2 optical splitting/combining unit 204 are directly applied to a ninth terminal of the third 2×2 optical splitting/combining unit 206. On the other hand, the optical signals emerging from the eighth terminal of the second 2×2 optical splitting/combining unit 204 are applied to a tenth terminal of the third 2×2 optical splitting/combining unit 206 via the second optical delay unit 205 having the delay time $T_2$ corresponding to twice the delay time $T_1$ of the first optical delay unit 203, namely, corresponding to ¹⁴/₈ of the interval of synchronous signals. As a result, the third 2×2 optical splitting/combining unit 206 outputs at its eleventh and twelfth terminals contiguous optical signals compressed by the unit of 4 bits at an interval corresponding to ⅛ of the interval of synchronous signals, as shown by a waveform "c" in FIG. 5D.

The optical signals emerging from the eleventh terminal of the third 2×2 optical splitting/combining unit 206 are applied to the optical switching unit ($SW_1$) 307. The optical switching unit 208 is allowed by a control signal from the control unit ($CNT_1$) 210 shown by a waveform "d" in FIG. 5 to pass only a compressed optical signal of 4 bits constituted by optical signals of frames of the same time point.

On the other hand, since the optical signals emerging from the twelfth terminal of the third 2×2 optical splitting/combining unit 206 have the travel direction opposite to the signal processing direction of the optical isolation unit 208, they can not pass through the optical isolation unit 208.

Thus, contiguous optical signals received in the optical isolation unit 201 are compressed by the unit of 4 bits at an interval corresponding to ⅛ of the interval of synchronous signals after passing through the optical switching unit 207 in response to control signals generated from the control unit 210, as shown by a waveform "e" in FIG. 5F.

A decompression procedure of compressing optical signals compressed by the unit of 4 bits at an interval corresponding to ⅛ of the interval of synchronous signals, carried out by the optical compression and decompression apparatus in accordance with the present invention will now be described.

Compressed optical signals, shown by a waveform "a" in FIG. 6B, entering the optical isolation unit 208 are allowed to pass through the optical isolation unit 208 because they have the travel direction identical to the signal processing direction of the optical isolation unit 208. The optical signals emerging from the optical isolation unit 208 are applied to the twelfth terminal of the third 2×2 optical splitting/combining unit 206. This case corresponds to the case of FIG. 2G. As a result, the third 2×2 optical splitting/combining unit 206 outputs at its ninth and tenth terminals optical signals reduced in intensity by half. The optical signals emerging from the ninth terminal of the third 2×2 optical splitting/combining unit 206 are directly applied to the seventh terminal of the second 2×2 optical splitting/combining unit 204, while the optical signals emerging from the tenth terminal of the third 2×2 optical splitting/combining unit 206 are applied to the eighth terminal of the second 2×2 optical splitting/combining unit 204 via the optical delay unit 205 having the delay time $T_2$. As a result, the second 2×2 optical splitting/combining unit 204 outputs at its fifth and sixth terminals compressed optical signals of 4 bits including input signals received therein and signals reproduced from the input signals, but shifted from the input signals by the delay time $T_2$, as shown by a waveform "b" in FIG. 6C.

The optical signals emerging from the fifth terminal of the second 2×2 optical splitting/combining unit 204 are directly applied to the third terminal of the first 2×2 optical splitting/combining unit 202, while the optical signals emerging from the tenth terminal of the third 2×2 optical splitting/combining unit 206 are applied to the fourth terminal of the first 2×2 optical splitting/combining unit 202 via the optical delay unit 203 having the delay time $T_1$. As a result, the first 2×2 optical splitting/combining unit 202 outputs at its first and second terminals compressed optical signals including input signals received therein and signals reproduced from the input signals, but shifted from the input signals by the delay time $T_1$, as shown by a waveform "c" in FIG. 6D.

The optical switching unit 110 which receives optical signals emerging from the second terminal of the first 2×2 optical splitting/combining unit 202 allows only optical signals of one bit to pass therethrough at original intervals upon receiving a control signal from the control unit ($CNT_2$) 212. On the other hand, the optical signals emerging from the first terminal of the first 2×2 optical splitting/combining unit 202 can not pass through the optical isolation unit 101 because they have the travel direction opposite to the signal processing direction of the optical isolation unit 201.

Thus, compressed optical signals received in the optical isolation unit 208 are decompressed at original contiguous intervals.

As apparent from the above description, the present invention provides a simultaneous optical compression and decompression apparatus usable for multiplex and demultiplex operations of a time-division type optical communication and switching system. The simultaneous optical compression and decompression apparatus of the present invention provides an arrangement enabling an easy mounting. Since the simultaneous optical compression and decompression apparatus requires a reduced number of control units, as compared to the conventional arrangement requiring separate optical compression and decompression units, it provides effects of an easy manufacture and an enhancement in stability of the overall system.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A simultaneous optical compression and decompression apparatus comprising:

M+1 2×2 optical splitting/combining means enabling simultaneous splitting and combining of optical signals in opposite directions, the M+1 2×2 optical splitting/combining means having input and output terminals and being multi-stage connected to each other at the input and output terminals thereof in a cascade manner;

lines respectively connecting inputs and outputs of adjacent ones of the M+1 2×2 optical splitting/combining means;

M delay means each disposed on one of the lines respectively connecting the input and output terminals of adjacent ones of the M+1 2×2 optical splitting/combining means and adapted to delay a signal on said one of the lines;

first optical isolation means adapted to input contiguous optical signals of N ($N=2^M$) bits at one of the terminals of a first one of the M+1 2×2 optical splitting/combining means in one direction;

first optical switching means adapted to switch contiguous optical signals reversely compressed and output from the first 2×2 optical splitting/combining means in response to a first control signal applied thereto;

first control means adapted to receive a synchronous signal from an external source and apply the first control signal to the first optical switching means in response to the synchronous signal;

second optical isolation means adapted to input compressed contiguous optical signals of N bits at one of the terminals of an M+1-th one of the M+1 2×2 optical splitting/combining means in one direction;

second optical switching means adapted to switch compressed contiguous optical signals of N bits output from the M+1-th 2×2 optical splitting/combining means in response to a second control signal applied thereto; and second control means adapted to receive a synchronous signal from an external source and apply the second control signal to the second optical switching means in response to the synchronous signal.

2. A simultaneous optical compression and decompression apparatus in accordance with claim 1, wherein the M delay means have delay times satisfying an equation of $T_{i+1}=2T_i$, respectively, i being a natural number of 1 to M.

* * * * *